United States Patent Office 2,721,861
Patented Oct. 25, 1955

2,721,861

PROCESS OF PREPARING AN ALUMINUM CASEINATE

Laurene O. Paterson, Adrian, Mich.

No Drawing. Application October 1, 1951,
Serial No. 249,817

6 Claims. (Cl. 260—113)

This invention relates broadly to the description and method of manufacture of a new antiacid material comprising a water insoluble aluminum proteinate. This application is a continuation-in-part of my previous application Serial No. 34,559, filed June 22, 1948, now abandoned.

Both protein, particularly protein hydrolyzates, and aluminum as a hydroxide, have been used successfully in the treatment of hyperchlorhydria. Aluminum hydroxide functions as a weak base in the stomach to counteract hyperacidity. Protein hydrolyzates have some buffer action and additionally promote tissue repair at the site of an ulcer.

Certain disadvantages attend the use of these materials as therapeutic agents. For example, protein hydrolyzates may promote the secretion of hydrochloric acid in the stomach, their use often leads to a pronounced acid rebound, they are unpalatable, and their ingestion may lead to nausea and diarrhea.

Aluminum hydroxide is available in the form of a colloidal gel and as a dry powder. The gel is an excellent antiacid but is bulky and difficult to preserve. On the other hand, when water is removed from the gel to produce the powder, some of the aluminum hydroxide may be converted to insoluble aluminum oxide which is useless in counteracting acidity. The tendency in drying aluminum gels is to lose too much of the combined water with subsequent conversion to an inactive hydrate.

The prior art deals largely with methods of preparing aluminum hydroxide gels, with special emphasis on the manufacture of powders which retain the high neutralizing capacity of the fresh gel. To my knowledge, aluminum proteinate as defined herein, which provides hydrated alumina in a particularly stable form as a proteinate, as well as my procedure for making it, are unknown in the art.

The Sondern et al. Patent No. 2,137,638 discloses a method of manufacturing aluminum hydroxide gel which avoids the danger during precipitation of exceeding the pH at which the gel redissolves in alkali.

The Jones Patent No. 2,166,868 discloses a method of manufacturing dried aluminum hydroxide gel. The final product is a powder which reverts to the hydrated or gel form upon the addition of water. Various materials are listed which usually are considered to act as dispersants and protective colloids in the preparation of a reactive powder. Such protective colloids invariably are used in very small amounts and do not enter into chemical combinations with the powder. Rather the colloid physically surrounds the aluminum hydroxide particles and by their physical presence aid in the redispersion of the mixture in water.

According to the Stephenson Patent No. 2,211,745, an active aluminum powder can be prepared by dissolving aluminum hydroxide gel in a twenty percent sugar solution and drying.

Also the Bird Patent No. 1,949,266 discloses that the absorbent powders of aluminum hydroxide gel can be increased by mixing it with kaolin.

The Lipschitz Patent No. 2,362,386 discloses an antiacid composition comprising a physical mixture of calcium caseinate and calcium carbonate in a dry form. This mixture combines the quick-acting carbonate with the slower neutralizing powers of amphoteric caseinate, but the final product merely has the added properties of the two individual components.

I have now developed an aluminum complex with protein in which these two moieties are chemically combined so as to produce a product which retains the therapeutically useful properties of protein and hydrated alumina but obviates to a large extent their undesirable properties. Aluminum proteinate embodying the present invention can be prepared in powder form, the hydrated aluminum so contained remaining completely active and as readily absorbable in stomach acidities as aluminum hydroxide gel. Substantially none of the aluminum in combination with the protein reverts to an acid-insoluble form during drying operations. Moreover the instant aluminum proteinate is palatable and has no apparent ill effects either during or after digestion.

Briefly I have discovered that aluminum either as a positive ion in aqueous solution or as a positively charged hydrate reacts with negatively charged dispersed proteins to form an insoluble complex herein referred to as aluminum proteinate. In practice the reacting conditions are controlled with respect to pH in order to obtain a product having the desirable properties referred to. For example when the aluminum for the reaction is supplied as a colloidal hydrate, it is essential that such colloidal hydrate and the colloidal protein carry opposite charges. An aluminum hydrate may be prepared in any conventional manner and is suspended in water to produce a fluid-like gel for use in the reaction. In this condition the pH of the dispersion should be below the isoelectric point of aluminum hydroxide (pH 6.8–7.2) the colloidal aluminum hydrate micelles then carrying a positive charge. A typical and suitable colloidal aluminum reactant satisfying the above requirements is aluminum hydroxide gel which may be U. S. P. if desired, though not necessarily.

Since the proteins are amphoteric, the pH of the colloidal protein solution or dispersion must be adjusted to above its isoelectric point to assure a negative charge on the protein micelles, but should not exceed approximately 7. If the protein is dispersed or peptized to a pH appreciably above 7, the desired reaction with the aluminum hydrate to precipitate aluminum proteinate will not occur, even though the protein micelles would carry a negative charge. The aluminum hydrate instead would dissolve in the excess base to form a soluble and negatively charged aluminate ion. In the above regard, the pH of the protein may be adjusted by any suitable base or basic salt which will effect dispersion of the protein. The alkali metal salts, such as sodium or potassium carbonate or bicarbonate by way of example, are desirable for this purpose because their use permits ready control over the pH. The stronger alkali metal bases such as sodium or potassium hydroxide may be employed, but the quantity required is more critical. Alkaline earth bases must be avoided since they tend to form insoluble complexes with the proteins.

Milk and soya proteins, by way of example, have isoelectric points between 4 and 5. Fresh skim milk has a pH of 6.5 to 6.8, so that the colloidal proteins as they occur naturally in skim milk are negatively charged. Other proteins, as for example soya protein, may be dispersed or peptized by a dilute base in water, such that the dispersed protein will carry a negative charge. Thus skim milk or an alkali peptized protein within the pH range discussed above may be added directly to U. S. P. aluminum hydroxide gel, by way of example. An immediate thickening of the mixture and subsequent precipitation of the aluminum proteinate will result. The precipitate may then be washed and dried.

As far as the reaction involving the present invention is concerned using aluminum in the ionic state, any suitable source of aluminum ion may be employed which of course does not contain factors other than aluminum that are reactive with the protein. An aqueous solution of an aluminum salt, particularly the chloride or sulfate, is a typical source of aluminum ion. The reaction may be carried out with the nitrate salt, but the resultant sodium or potassium nitrate must be removed before use of the aluminum proteinate as an antacid. Such aluminum salts are strongly acidic and if added directly to a colloidal protein having the pH range discussed above, as for example, skim milk, an acid casein curd would immediately form and prevent interaction between the protein and the aluminum. Solutions of such acidic aluminum salts are thus not suitable for interaction with the protein and must be treated with a base to remove the free acid. In practice sufficient base should be added to raise the pH to above approximately 4 and preferably to approximately 5 in the usual instance. Within this range of pH, the aluminum is still in ionic solution. The reaction product has been designated as an aluminum hydroxy salt. Although it still contains sufficient strong anion to maintain its solubility, the free acid has been substantially removed. Such aluminum hydroxy salts may be purchased, but I prefer to prepare them in the course of manufacture of the aluminum proteinate. The colloidal protein is then added at a pH above its isoelectric point and below approximately 7 to effect a fine precipitate of the aluminum proteinate. By correctly proportioning the two reactants, all of the aluminum and the protein may be quantitatively removed from the solution. The precipitate may be washed free of water soluble impurities and dried. The initial acid anion does not become part of the final reaction product and may be washed away substantially completely as a soluble sodium or potassium salt.

In the above general procedure, neutralization of the acidic aluminum salt may be accomplished by any suitable base or basic salt, as discussed above in regard to peptizing the protein. Again, use of an alkali metal carbonate is desirable, since the exact quantity required for the proper pH range is less critical, although the stronger bases such as sodium or potassium, hydroxides may be used. Above a pH of 5, the aluminum begins to precipitate as a hydroxide gel, which also reacts with the colloidal protein upon addition of the latter, provided that the pH is maintained below the isoelectric point of aluminum hydroxide, as discussed above. It is to be noted accordingly that the reaction involving the present invention may be carried out within the pH limits specified, whether the aluminum is employed in an ionic or colloidal condition or partially in both conditions.

In a typical example, a solution of the base is added slowly to the aluminum salt in water with stirring and at elevated temperature. Any precipitated aluminum gel redissolves. At a pH of about 5, the aluminum still exists in an ionic state ready to react with the protein, but the free acid of the solution will have been substantially neutralized. The aluminum proteinate, may be formed substantially in accordance with the following general formula upon addition of the colloidal protein to the solution.

Al(OH)$_x$Cl$_x$ plus Na caseinate→Al caseinate plus $x$NaCl.

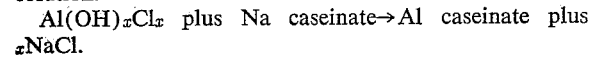

The following examples illustrate specific procedures for marking aluminum proteinate embodying the invention.

Example I

To 200 grams of aluminum hydroxide gel U. S. P. at 40° C. is added 130 ml. of skim milk at the same temperature. An initial thickening of the mixture occurs, but with stirring the aluminum proteinate separates and may be filtered off. This precipitate is washed, then dried at 50° C. and reduced to a powder comprising a hydrate of aluminum caseinate and an aluminum complex with lactalbumin, the proteins being present in the proportions in which they occur normally in milk.

Example II

A casein curd is prepared by adding to 300 ml. of skim milk sufficient dilute hydrochloric acid to lower the pH to the isoelectric point of casein (pH 4.6). This curd is washed, then peptized with dilute sodium bicarbonate solution to a pH of 6.5. To the peptized protein, 200 grams of aluminum hydroxide gel U. S. P. are added. A thickening of the mixture results and the pH rises to 7.1. With stirring, aluminum caseinate separates, which may be filtered off, washed, and dried as above. Probably there occurs an initial colloidal neutralization of charge followed by a chemical reaction of the protein with the aluminum which releases alkali according to the following formula:

Aluminum hydroxide plus sodium caseinate→aluminum caseinate plus sodium hydroxide.

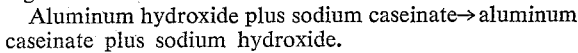

Example III

To a dilute solution of aluminum chloride, prepared by dissolving 16 grams of AlCl$_3$.6H$_2$O in 400 ml. of water at 70° C., is added 190 ml. of 5% sodium carbonate solution at the same temperature. CO$_2$ is evolved and any precipitated aluminum hydroxide redissolves with continued stirring. The pH of this solution is 5 to 5.2. The temperature is allowed to fall to 40° C., 320 ml. of fresh skim milk at 35° C. is added with stirring. Precipitation occurs and the pH rises. Upon standing a clear supernatant liquid is formed which is free of both aluminum ions and protein. This liquid may be removed by decantation. The precipitate is washed to remove the sodium chloride and milk sugar. It is dried at 50° C. and then reduced to a powder. The end product thus produced is a mixture of a hydrate of aluminum caseinate and an aluminum complex with lactalbumin, the proteins being present in the proportions in which they occur normally in milk.

An analysis of the aluminum proteinate described in Example III discloses that the materials are present in the amounts indicated:

| | Percent |
|---|---|
| Protein | 44 |
| Aluminum (as Al$_2$O$_3$) | 23 |
| Sodium chloride | 1 |
| Water (toluene distillation) | 6 |

The components of the above analysis do not total 100% since the aluminum is calculated as aluminum oxide and not as it actually occurs.

Example IV

An ionic solution of aluminum is prepared by dissolving 44 grams of aluminum sulfate N. F.

(Al$_2$(SO$_4$)$_3$.18H$_2$O)

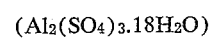

in 400 ml. of water at 70° C. and treating with 5% sodium bicarbonate solution to remove the free acid. To this aluminum solution is added at 40° C. 200 ml. of a solution containing 10 grams of alkali dispersed soya protein having a pH of 6.5. The aluminum proteinate precipitates. The precipitate is washed and dried as described above in Example III.

In practice, the relative amounts of aluminum hydroxide and dispersed protein which are mixed together to form the aluminum proteinate may be varied within wide limits. I have found that proteins, dependent upon their structure, may have many combining weight for aluminum. For instance in Example III, 560 ml. of skim milk may be added to the solution with complete removal of the casein and the lactalbumin in the form of the aluminum complex.

Although either skim milk or soya protein is used in all of the above examples as a source of protein, other suitable proteins may be employed. I have found for example that gelatin and egg albumen above their isoelectric points are the full equivalent of milk protein in so far as operability in the process is concerned. The particular protein used does not appear to be critical in the process.

If desired, additional aluminum hydroxide gel may be stirred into the suspension of the aluminum proteinate before the latter is dried. The added aluminum hydroxide gel is in turn colloidally protected by the aluminum proteinate to make the blend readily soluble in dilute hydrochloric acid even after the mixture has been thoroughly dried. The added gel permits selected, increased antiacid values to be imparted to the complex.

It may thus be seen that I have achieved the object of my invention. Aluminum in the form of a complex protein compound imparts several unique properties both to the aluminum as an antiacid and to the protein as a source of amino acid for ulcer healing.

For example, it is difficult to dehydrate aluminum hydrate gel and still retain complete solubility in 0.1 N HCl. The best commercial preparations made at the present time having requisite solubility contain about 50% water of hydration and this water has no medicinal value. Aluminum proteinate prepared according to the present invention contains less than 20% of combined water and yet the product is completely soluble in dilute hydrochloric acid. Aluminum in this form not only retains its full antiacid equivalent but it is released slowly from the complex molecules only as acid concentration rises in the stomach. In this respect it offers quick action during periods of hyperacidity but remains an excellent demulcent during periods of reduced acid secretion.

In addition to the above, drying of the most intact proteins denatures them. Commercial production of casein and lactalbumin results in hard unfriable granules which easily irritate ulcerated areas. In aluminum proteinate prepared according to the present invention, the protein retains all of the characteristics of a freshly prepared curd. It is completely soluble in 0.1 N HCl and consequently is readily digestible. The complex as prepared from fresh skim milk contains all of the lactalbumin originally in the milk, giving added nutritive value to the protein.

I claim:

1. A process of preparing an acid-soluble aluminum proteinate useful as an antacid which comprises admixing an aqueous dispersion of a protein, from the group consisting of milk proteins, casein, soy bean protein, gelatin and egg albumin, which dispersion has a pH value above the isoelectric point of the protein but below about 7, with an aqueous medium having a pH value above about 4 but below the isoelectric point of aluminum hydroxide, said medium being selected from the group consisting of a solution of an ionizable soluble aluminum salt and a dispersion of aluminum hydroxide, whereby to form a reactive medium having a pH value above the isoelectric point of said protein but below about 7 and whereby said aluminum proteinate is precipitated, and thereafter separating the resulting precipitate from the resulting mixture as the desired product.

2. A process of preparing a water-insoluble antacid composition consisting essentially of aluminum caseinate substantially soluble in 1/10 normal hydrochloric acid which comprises admixing an aqueous dispersion of casein having a pH above 4.6 but below about 7 with an aqueous medium having a pH value between about 4 and about 7 and selected from the group consisting of a solution of an ionizable soluble aluminum salt and a dispersion of aluminum hydroxide, whereby to form a medium having a pH value between about 5 and about 7 and whereby said aluminum caseinate is precipitated, and thereafter separating the resulting precipitate from the resulting mixture as the desired product.

3. A process of preparing a water-insoluble antacid composition consisting essentially of aluminum caseinate substantially soluble in 1/10 normal hydrochloric acid which comprises admixing an aqueous dispersion of casein having a pH between about 5 and about 7 with an aqueous dispersion of an aluminum hydroxide gel having a pH between about 5 and about 7 whereby said aluminum caseinate is precipitated, and thereafter separating the resulting precipitate from the mother liquor as the desired product.

4. A process of preparing a water-insoluble antacid composition consisting essentially of aluminum caseinate substantially soluble in 1/10 normal hydrochloric acid which comprises preparing an aqueous medium of an ionizable, water-soluble aluminum salt, adjusting the pH of said medium to a value between about 4 and about 7, admixing the resulting medium with an aqueous dispersion of casein having a pH between about 5 and about 7 whereby to form a medium having a pH value above 4.6 but below about 7 and whereby said aluminum caseinate is precipitated, and thereafter separating the resulting precipitate from the mother liquor as the desired product.

5. The process recited in claim 4 wherein said aluminum salt is an aluminum salt of a strong inorganic acid and said pH adjustment is effected with a weak inorganic base.

6. The process recited in claim 5 wherein said inorganic base is an alkali metal carbonate.

References Cited in the file of this patent

UNITED STATES PATENTS

| | | |
|---|---|---|
| 1,686,281 | Kuttel | Oct. 2, 1928 |
| 2,103,153 | Dunham | Dec. 21, 1937 |
| 2,212,470 | Friedrick | Aug. 20, 1940 |

FOREIGN PATENTS

| | | |
|---|---|---|
| 312,702 | Germany | Oct. 27, 1932 |

OTHER REFERENCES

Krantz et al., J. Pharm. Exp. Therap., vol. 82, No. 3, Nov. 1944, pp. 247–253.